Sept. 28, 1948.                H. V. DONALDSON                2,450,083
                    TREATED PAPER LINER FOR ADHESIVE ROLLS
                            Filed Feb. 7, 1944

INVENTOR
HENRY V. DONALDSON,
BY
Toulmin & Toulmin
ATTORNEYS

Patented Sept. 28, 1948

2,450,083

UNITED STATES PATENT OFFICE 2,450,083

TREATED PAPER LINER FOR ADHESIVE ROLLS

Henry Verner Donaldson, Glencoe, Ill., assignor to The Munising Paper Company, Munising, Mich., a corporation of Ohio Application February 7, 1944, Serial No. 521,357

2 Claims. (Cl. 154—53.5)

This invention relates to tape and particularly to the adhesive tape or sheets, the adhesive surface of which is protected by nonadhesive sheets.

Adhesive sheets or tape, when stored or when wound onto a spool, will ordinarily adhere to one another unless the adhesive surface thereof is provided with a protective sheet to prevent the individual sheets or layers from sticking to each other or to other objects, such as scissors, or to the fingers while handling the tape, etc., and besides—especially in the case of surgical dressings—the adhesive surface can become contaminated if it is not covered by a protective sheet. Heretofore, crinoline or gauze have been used mostly for this purpose. Both materials, however, have the disadvantage that they do not give sufficient protection since they are permeable to a certain degree, for instance to dust particles, humidity, grease and to germs, so that the tape, while being handled, is most liable to become contaminated, and tape which has been disinfected, therefore loses its sterility. Another disadvantage of tape covered with the materials named above, is that air has access to the adhesive substances on the sheet thus causing reactions of the substances such as oxidation, polymerization and condensation which accelerate the aging process of such adhesive substances and thus reduce their durability.

One object of the present invention is to provide an adhesive tape the sheets or layers of which do not stick to each other or to undesired objects while handling the tape.

Another object of the invention is to provide an adhesive tape which has the adhesive surface protected against contamination.

Another object of the invention is to provide an adhesive tape in which aging of the adhesive surface, and thus reduction of the adhesive power during storage, is inhibited to a high degree.

Still another object of the invention is a protectively covered adhesive tape the covering layer of which is readily removable and which is impervious to prevent oxidation of the adhesive layer.

Still another object of the invention is a protectively covered adhesive tape the covering layer of which adheres to the adhesive surface of the tape without physically combining with it.

Still another object of the invention is a protectively covered adhesive tape the covering layer of which has adhesive repellant property so that it can be completely peeled off without taking along adhesive substance.

Still another object of the invention is a protectively covered adhesive tape the particles of the covering layer of which have a greater cohesive power than they have adhesive power to the adhesive substance of the tape.

Still another object of the invention is a protectively covered adhesive tape the covering layer of which is impermeable to contaminating substances or germs.

The objects of my invention are accomplished by using for the protection of adhesive sheets or tapes paper which is substantially impermeable to contaminating substances and germs and the particles of which have a higher degree of cohesive power than adhesive affinity to the glutinous surface of the tape. Especially satisfactory results have been obtained with papers impregnated with materials generally designated in the art as synthetics.

One embodiment of my invention is illustrated in the accompanying drawings, in which.

Figure 1:
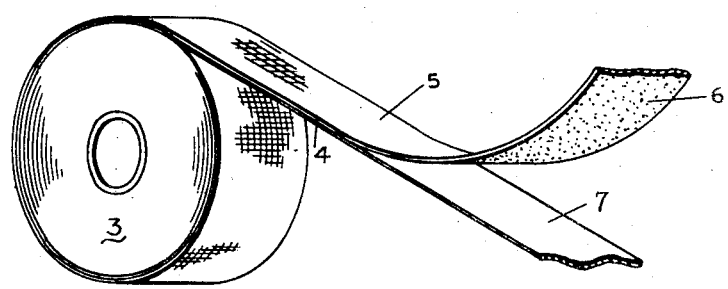
Figure 1 is a perspective view of adhesive tape wound on a spool.
Figure 2:
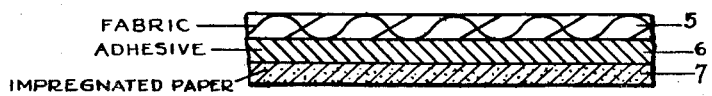
Figure 2 is a fractional cross sectional view at an enlarged scale, of the tape shown in Figure 1.

In Figure 1, 3 is a spool onto which the tape 4 is wound. As shown in Figure 1, and more clearly in Figure 2, the tape consists of a fabric base 5, covered with an adhesive layer 6. A layer of impregnated paper 7 is applied on the adhesive surface 6 so that on the spool in each layer this paper sheet 7 separates the fabric base 5 of the tape of one layer and the adhesive surface of the tape of the following layer.

Paper so impregnated has all the advantages desired of such adhesive material. It is strong enough so that it does not tear off while being removed from the tape. It has just enough adhering power to stick to the tape, but still remains physically separated from the adhesive material so that when being peeled off the adhesive surface, the adhesive substance is not peeled off the base nor do paper particles or lint remain on the adhesive surface, in other words, a complete separation of the two sheets is possible. The paper, impregnated according to the invention, is substantially impermeable to all ordinary substances so that handling the adhesive material while still covered with the paper does not endanger its cleanliness, nor its sterility in the case of surgical dressings. Most unexpected and surprising was the fact that the life and durability of the adhesive power of such tape is considerably increased, probably because the access of air and thus chemical aging reactions of the adhesive substances are reduced in comparison to those having protective layers of the previously mentioned materials.

As material for impregnating the paper, all materials tested which are designated in the art as synthetics have proven suitable. Synthetic rubbers, especially those mixed with plasticizers, synthetic resins, plastics, lacquers, varnishes, cellulose compounds, e. g. ethyl cellulose or cellulose acetate, and others have given satisfactory results.

The impregnated paper provides a protective covering for the adhesive that has a smooth surface with all lint fibers fully secured to the base of the paper whereby the lint fibers will not be torn from the base material of the paper when the paper is peeled from the adhesive surface. The impregnation of the paper by the use of the aforementioned synthetic materials bonds the lint fibers of the paper together without causing any substantial brittleness of the paper which would tend to cause the paper to tear when peeling the same from the adhesive surface. While the use of paper impregnated with synthetic materials is preferable yet it is not intended to exclude any paper that has a bonding agent therein that produces a smooth surface on the paper to make it substantially lint free or wherein the lint in the paper is securely held therein so that it will not be torn from the paper when unwound from the adhesive. Also, the bonding or impregnating agent can have disinfectant properties or disinfectants can be added to the paper to retain the sterility of the surface of the adhesive.

Further, the use of paper impregnated with synthetic resins provides a substantially impermeable material which prevents air from entering the adhesive surface and thereby prevents oxidation and aging of the adhesive.

It will also be understood that the base of the adhesive does not necessarily have to be made of fabric and that the materials such as wire gauze, wood, metal foils and others may be used.

It will be also understood that the invention is not restricted to tapes wound on spools, but that all kinds of sheets or preformed pieces of adhesive materials covered with impregnated paper sheets are within the scope of the invention. Likewise, for example, preformed pieces of adhesive sheets may be applied on one continuous strip of paper impregnated according to invention and this strip then wound on a spool or similar core.

It will further be understood that while there have been described certain specific embodiments of my invention it is not intended thereby to have this invention limited to or circumscribed by the specific details of materials, arrangement of parts and conditions set forth in the specification or illustrated in the drawing in view of the fact that this invention may be modified according to individual preference and conditions without departing from the spirit of this disclosure and the scope of the appended claims.

Having thus fully described my invention, what I claim as new and desire to secure by Letters Patent is:

1. As an article of manufacture, adhesive sheet material adapted to be removably secured to a person consisting of a base, a coat of adhesive material on said base, and a paper cover on said adhesive surface containing and impregnated with a synthetic resin bonding the lint fibers on the surface of the paper to the base thereof and incorporating in the base the physical characteristics of imperviousness and flexibility without brittleness whereby the paper cover can be removed from the adhesive surface without adherence of any particles of one material upon the other.

2. As an article of manufacture, adhesive sheet material adapted to be removably secured to a person consisting of a fabric base, a coat of adhesive material on said base and a paper cover on said adhesive surface, said paper containing a disinfectant and being impregnated with a synthetic resin bonding the lint fibers on the surface of the paper to the base thereof, said disinfectant and said resin incorporating into the base the physical characteristics of sterility, imperviousness and flexibility without brittleness whereby the paper can be removed from the adhesive surface without adherence of any particles of one material upon the other and without endangering the sterility of the tape.

HENRY VERNER DONALDSON.

REFERENCES CITED

The following references are of record in the file of this patent:

UNITED STATES PATENTS

| Number | Name | Date |
|---|---|---|
| 1,445,894 | Laisy | Feb. 20, 1923 |
| 1,476,682 | Beckmann | Dec. 11, 1923 |
| 1,861,530 | Hayden et al. | June 7, 1932 |
| 2,254,883 | Boyle | Sept. 2, 1941 |
| 2,303,826 | De Bell | Dec. 1, 1942 |
| 2,395,668 | Kellgren et al. | Feb. 26, 1946 |

FOREIGN PATENTS

| Number | Country | Date |
|---|---|---|
| 319,215 | Great Britain | Dec. 11, 1930 |
| 755,273 | France | Sept. 2, 1941 |